14/87 OR 4,657,347

United States Patent [19]

Nishimura

[11] Patent Number: 4,657,347

[45] Date of Patent: Apr. 14, 1987

[54] LIQUID CRYSTAL DISPLAY WITH ZENER DIODE

[75] Inventor: Yoshiharu Nishimura, Shizuoka, Japan

[73] Assignee: Tokyo Electric Co., Ltd., Tokyo, Japan

[21] Appl. No.: 896,117

[22] Filed: Aug. 12, 1986

[30] Foreign Application Priority Data

Aug. 21, 1985 [JP] Japan ................................ 60-183651

[51] Int. Cl.[4] ......................... G02F 1/133; G05F 3/18; G09G 3/00

[52] U.S. Cl. .................................... 350/332; 323/231; 340/813

[58] Field of Search ................ 350/332; 340/813, 784, 340/765; 323/229, 230, 231, 282, 284, 286, 288

[56] References Cited

U.S. PATENT DOCUMENTS

| | | | |
|---|---|---|---|
| 3,086,160 | 4/1963 | Loftus | 323/231 X |
| 3,613,351 | 5/1969 | Walton | 350/332 X |
| 4,044,546 | 8/1977 | Koike | 350/332 |
| 4,507,600 | 3/1985 | Okayama | 323/281 |
| 4,570,115 | 2/1986 | Misawa | 340/813 |

FOREIGN PATENT DOCUMENTS

| | | | |
|---|---|---|---|
| 1136406 | 1/1961 | Fed. Rep. of Germany | 323/282 |
| 50-61133 | 5/1975 | Japan . | |
| 50-60713 | 5/1975 | Japan . | |
| 53-139998 | 12/1978 | Japan . | |
| 56-94413 | 7/1981 | Japan . | |

OTHER PUBLICATIONS

Millman et al., *Electronic Devices and Circuits* Sec. 6–12, pp. 143–147 McGraw Hill Book Co. 1967.

*Primary Examiner*—John K. Corbin
*Assistant Examiner*—David Lewis
*Attorney, Agent, or Firm*—Frishauf, Holtz, Goodman & Woodward

[57] ABSTRACT

A liquid crystal display apparatus includes a liquid crystal display device having a plurality of display digits, a one-chip microcomputer having a plurality of voltage terminals for driving the liquid crystal display device by selectively supplying the voltages applied to those voltage terminals to the liquid crystal display device, and a power supply circuit for applying voltages to the voltage terminals, this power supply circuit having a series circuit of a plurality of resistors one end of which is connected to the first power source terminal and which has a plurality of nodes connected to the voltage terminals. The power supply circuit has a Zener diode which is connected between the other end of the series circuit and the second power source terminal and which is made operative in the saturation region.

12 Claims, 7 Drawing Figures

FIG. 1
(PRIOR ART)
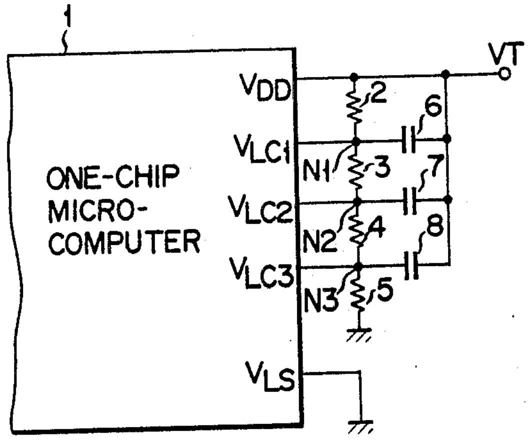
FIG. 2A
(PRIOR ART)
FIG. 2B
(PRIOR ART)
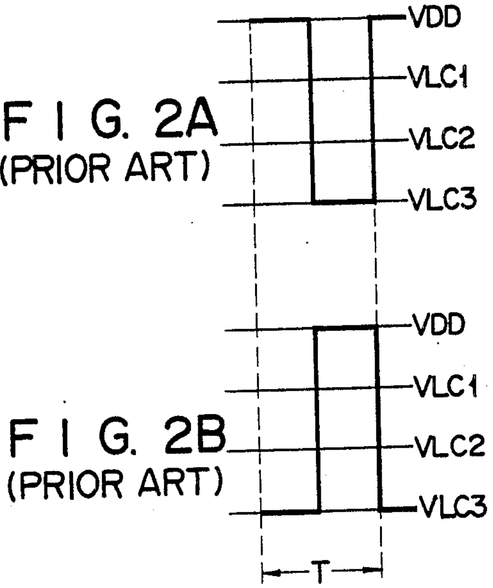
FIG. 3A
(PRIOR ART)
FIG. 3B
(PRIOR ART)
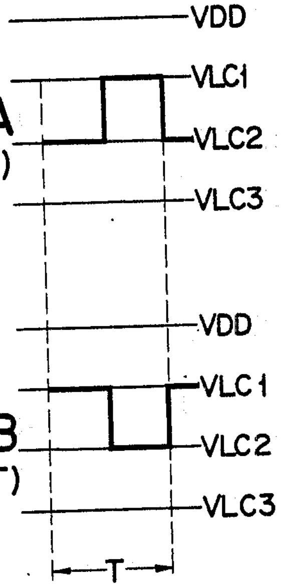

LIQUID CRYSTAL DISPLAY WITH ZENER DIODE

BACKGROUND OF THE INVENTION

The present invention relates to a liquid crystal display apparatus having a plurality of display digits.

The electric power consumption of a liquid crystal display device is remarkably small as compared with a display devices using fluorescent display devices and light emitting diodes. Therefore, in the case of using the display device in conjunction with a microcomputer or the like, a liquid crystal display device having a small electric power consumption is advantageously used. Especially in the case where a battery is used as a power source, the use time of the power source is prolonged; therefore, the liquid crystal display device is even more advantageously used.

FIG. 1 shows a liquid crystal display apparatus using a one-chip microcomputer (μPD 7514) 1 which is on the market from Nippon Electric Co., Ltd. (NEC) to dynamically drive the liquid crystal display device. This liquid crystal display apparatus comprises: four resistors 2 to 5 connected in series between a positive power source terminal VT and the ground; and capacitors 6 to 8 connected respectively between positive power source terminal VT and nodes $N_1$ to $N_3$ of resistors 2 to 5. Voltage source terminals VDD, $VLC_1$, $VLC_2$, and $VLC_3$ of one-chip microcomputer 1 are connected to positive power source terminal VT and nodes $N_1$ to $N_3$. To reduce the electric power consumption, for example, each resistance value of resistors 2 to 4 is set to 100 kΩ, a resistance value of resistor 5 is set to 82 kΩ, and a voltage between voltage source terminals VDD and $VLC_1$is set to about 3 V. Microcomputer 1 drives the liquid crystal display device in accordance with a ⅓ bias system. Namely, in the case of energizing the segment, a common signal which varies from the VDD level to the $VLC_3$ level as shown in FIG. 3A is applied to the common electrodes in each period T, and a segment signal which changes from the $VLC_3$ level to the VDD level as shown in FIG. 3B is applied to the segment electrodes. In the ordinary operating mode, when no segment is energized, a common signal which varies from the $VLC_2$ level to the $VLC_1$ level as shown in FIG. 2A is applied to common electrodes in each period T, and a segment signal which changes from the $VLC_1$ level to the $VLC_2$ level as shown in FIG. 2B is applied to segment electrodes. On the contrary. Microcomputer 1 uses voltages which are applied to voltage source terminals VDD and $VLC_1$ to $VLC_3$ as voltages at the levels of VDD and $VLC_1$ to $VLC_3$.

In such a kind of liquid crystal display apparatus, suppose that the liquid crystal display device has a weight display section consisting of five digits including the minus sign, a unit price display section consisting of five digits, and a price display section consisting of six digits, for example. In this case, in the cases where, for example, "0" of one digit is displayed on each of the weight, unit price, and price display sections and where fifteen numerals are displayed on these display sections, there is the problem such that the luminances of the displayed liquid crystal display elements differ. For example, assume that a voltage VX between voltage source terminals VDD and $VLC_3$ is set to 3 V in the case where eight numerals are displayed. Then, in the case of the display of three numerals, an effective impedance of the liquid crystal display device increases and a current flowing through resistor 5 decreases, so that voltage VX will increase to 3.3 V. In the case of the display of fifteen numerals, a large current flows through resistor 5, so that voltage VX will be reduced to 2.7 V. To properly drive the liquid crystal display device, voltage VX needs to be suppressed within a range of 2.9 to 3.1 V. In the case where numerals of fewer digits were displayed, these numerals become too bright. On the contrary, in the case where numerals of many digits were displayed, these numerals become faint. In this manner, the luminances of the liquid crystal display elements to be displayed largely vary in dependence on the number of digits of numerals to be displayed, so that the displayed numerals are fairly hard to see.

SUMMARY OF THE INVENTION

It is an object of the present invention to provide a liquid crystal display apparatus in which the luminances of the displayed liquid crystal display elements can be maintained substantially constant irrespective of the number of digits of the displayed liquid crystal display elements.

This object is accomplished by a liquid crystal display apparatus comprising: a liquid crystal display unit having a plurality of display digits; a liquid crystal drive unit having a plurality of voltage terminals for driving the liquid crystal display unit by selectively supplying the voltages applied to the voltage input terminals to the liquid crystal display unit; a resistive element which is connected at one end to a first power source terminal and which has a plurality of voltage nodes connected to the voltage terminals; and a Zener diode which is connected between the other end of the resistive element and a second power source terminal and which is made operative in a saturation region.

In this invention, a current which is almost always constant flows through the Zener diode; therefore, the voltages to be applied to the voltage terminals are maintained almost constant irrespective of a variation of the number of liquid crystal display elements to be displayed. Thus, large variances are prevented in the luminances of the liquid crystal display elements being displayed.

BRIEF DESCRIPTION OF THE DRAWINGS

FIG. 1 is a schematic circuit diagram of a conventional liquid crystal display apparatus;

FIGS. 2A and 2B show voltages which are applied to common and segment electrodes of the liquid crystal display device shown in FIG. 1 in the case where this liquid crystal display device is energized;

FIGS. 3A and 3B show voltages which are applied to the common and segment electrodes of the liquid crystal display device shown in FIG. 1 in the case where this liquid crystal display device is not energized;

DETAILED DESCRIPTION OF THE PREFERRED EMBODIMENT

Figure 4:
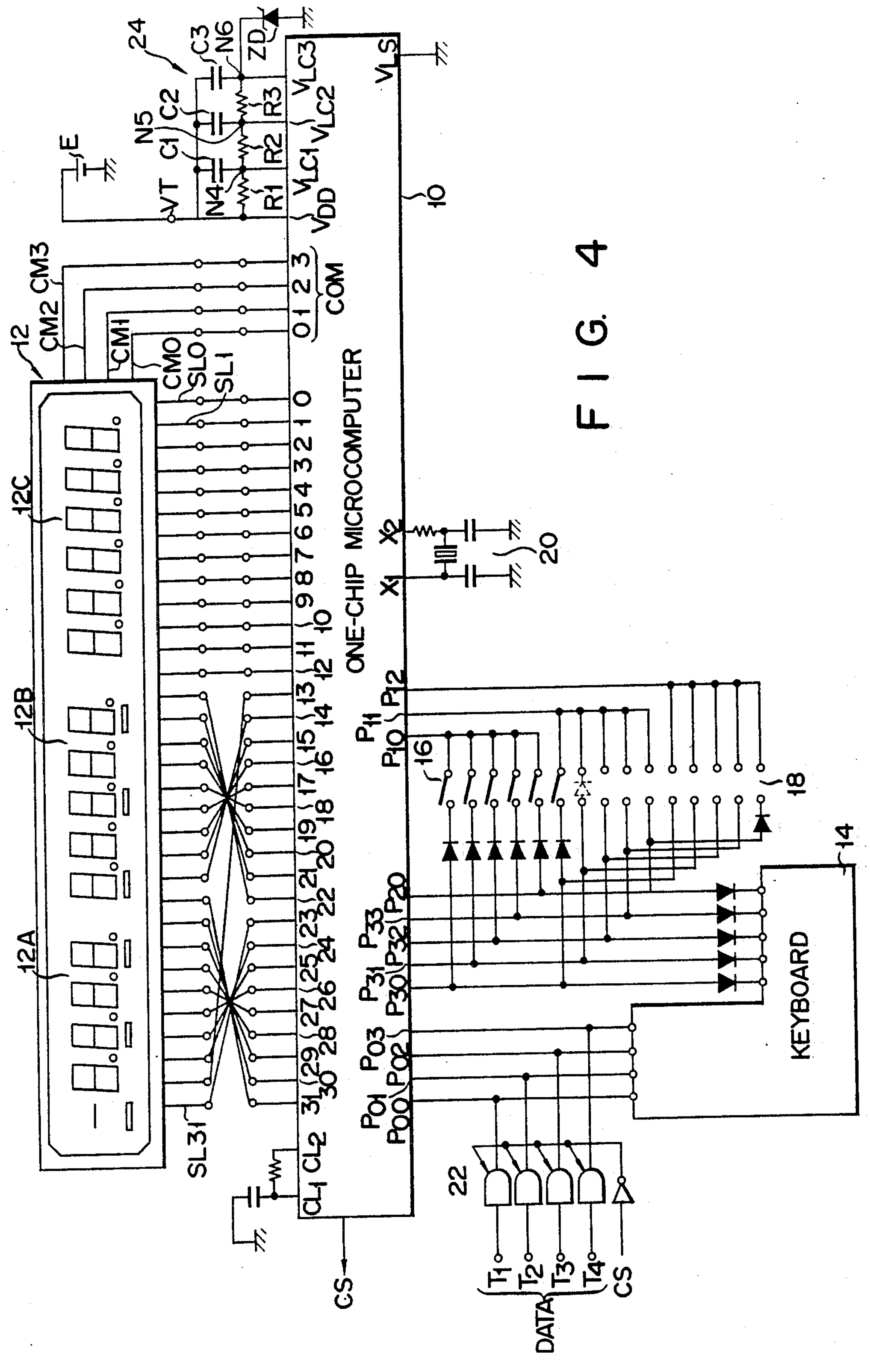
FIG. 4 is a circuit diagram of a liquid crystal display apparatus according to one embodiment of the present invention.

A liquid crystal display apparatus according to one embodiment of the present invention shown in FIG. 4 comprises a one-chip microcomputer (μPD 7514 ) 10 which is on the market from NEC; and a liquid crystal display device 12. Microcomputer 10 has common signal output terminals "0" to 37 3" connected to common lines CM0 to CM3 of liquid crystal display device 12 and segment signal output terminals "0" to "31" selectively connected to segment lines $SL_0$ to $SL_{31}$.

For example, liquid crystal display device 12 is constituted as a display device of sixteen digits including: a weight display section 12A of five digits including the minus sign; a unit price display section 12B of five digits; and a price display section 12C of six digits. This liquid crystal display device is used for, for example, a weight measuring device.

A keyboard 14 to input numeral data and the like, dip switches 16 to set the specification, diode pins 18, and an oscillator 20 to generate a reference clock are connected to microcomputer 10. AND gates 22 are connected to data input lines starting from keyboard 14 and reaching microcomputer 10. These AND gates are controlled by a chip selection signal CS and function to transfer the weight data and the like which were input to terminals $T_1$ to $T_4$ from, for example, a CPU of a weight measuring device to microcomputer 10.

A power supply circuit 24 is coupled to voltage source terminals VDD and $VLC_1$ to $VLC_3$ of microcomputer 10. Power supply circuit 24 has a series circuit of three resistors $R_1$ to $R_3$ which is connected at one end to power source terminal VT and voltage source terminal VDD and at the other end grounded through a Zener diode ZD. A node $N_4$ between resistors $R_1$ and $R_2$, a node $N_5$ between resistors $R_2$ and $R_3$, and a node $N_6$ between resistor $R_3$ and Zener diode ZD are connected to power source terminal VT through capacitors $C_1$, $C_2$, and $C_3$, respectively, and also connected to voltage source terminals $VLC_1$, $VLC_2$, and $VLC_3$, respectively.

Figure 5:
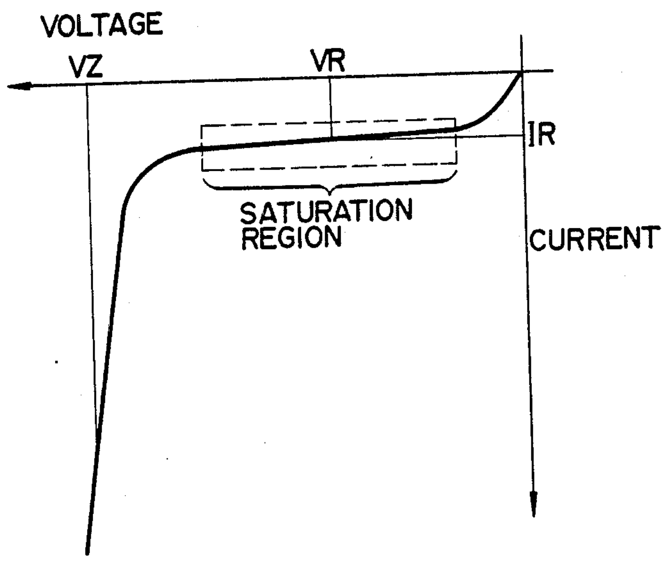
FIG. 5 shows a characteristic diagram of a Zener diode which is used in the liquid crystal display apparatus shown in FIG. 4.

In power supply circuit 24, the values of power source voltage VT and resistors $R_1$ to $R_3$ are selectively determined so that the voltage between voltage source terminals VDD and $VLC_3$ becomes 3 V when numerals of eight digits are displayed on liquid crystal display device 12. In this embodiment, power source voltage VT is 5 V and each of resistors $R_1$ to $R_3$ has a high resistance value of 100 kΩ, and each of capacitors $C_1$ to $C_3$ has a capacitance of $10^4$ pF. As indicated by a broken line in FIG. 5, Zener diode ZD has a Zener voltage VZ of, e.g., 4.7 V so as to operate in the saturation region. Thus, even if the voltage to be applied to Zener diode ZD is slightly deviated from a reference voltage VR of, e.g., 2 V, a current flowing through Zener diode ZD will not vary widely from a reference current IR.

In the embodiment, when numerals of eight digits are displayed on display device 12, the voltage between voltage source terminals VDD and $VLC_3$ is set to 3 V. On the other hand, in the case of displaying numerals of three digits, the effective impedance of liquid crystal display device 12 is larger than that in the case of displaying numerals of eight digits. Therefore, the current flowing through resistors $R_1$ to $R_3$ increases. However, since the current flowing through Zener diode ZD is maintained substantially constant, an increase in the current flowing through resistors $R_1$ to $R_3$ can be suppressed. In the case of displaying numerals of fifteen digits, the effective impedance of liquid crystal display device 12 is smaller than the case of displaying numerals of eight digits. Thus, the current flowing through resistors $R_1$ to $R_3$ decreases. However, since the current flowing through Zener diode ZD is almost completely constant, a reduction of the current flowing through resistors $R_1$ to $R_3$ is suppressed to a minimum value. Since Zener diode ZD is made operative in the saturation region in this manner, even if the number of digits of numerals to be displayed on display device 12 is changed, the current flowing through resistors $R_1$ to $R_3$ will not so largely vary. Therefore, the variation range of voltage VX between voltage receiving terminals VDD and $VLC_3$ can be suppressed to a small value. For example, even in the case where numerals of the maximum number of digits are displayed on display device 12, voltage VX can be held to a value above about 2.9 V. On the other hand, even when the minimum number of digits are displayed or only one digit is displayed, voltage VX can be held to a value below 3.1 V. Thus, liquid crystal display device 12 can be suppressed to a range of 2.9 to 3.1 V as a rated driving voltage range. Due to this, the respective display elements of liquid crystal display device 12 are lit up with substantially the same luminance irrespective of the number of display elements to be displayed, thereby enabling each display element to be always displayed with proper luminance. Further, even in the case where the number of digits to be displayed is small, the driving voltage will not exceed the rated driving voltage range, so that the electric power consumption is small. Therefore, even in the case of using as a power source a battery E which is used as a power source for driving microcomputer 10, the service life of this battery will not be reduced.

Although the present invention has been described above with respect to one embodiment, the invention is not limited to only this embodiment. For example, in the embodiment, the one-chip microcomputer (μPD 7514 ) has been used. However, another display drive circuit may be also used if it can drive liquid crystal display device 12 by use of the voltages of the VDD and $VLC_1$ to $VLC_3$ levels.

In addition, although the $\frac{1}{3}$ bias method whereby the power source voltage is divided by resistors $R_1$ to $R_3$ has been used in the embodiment, liquid crystal display device 12 may be also driven by the $\frac{1}{2}$ bias method.

What is claimed is:

1. A liquid crystal display apparatus comprising:

liquid crystal display means having a plurality of display digits;

liquid crystal drive means having a plurality of voltage terminals for driving said liquid crystal display means by selectively supplying voltages applied to said voltage terminals to said liquid crystal display means;

first and second power source terminals; and a power supply circuit for applying voltages to said voltage terminals, said power supply circuit having resistor means which is connected at one end to said first power source terminal and which has a plurality of nodes connected to said voltage terminals, and a Zener diode which is connected between the other end of said resistor means and said second power source terminal and which is made operative in a saturation region.

2. A liquid crystal display apparatus according to claim 1, wherein said liquid crystal drive means is a one-chip microcomputer.

3. A liquid crystal display apparatus according to claim 2, wherein said power supply circuit further has a plurality of capacitor means connected between said first power source terminal and the nodes of said resistor means, respectively.

4. A liquid crystal display apparatus according to claim 3, wherein said liquid crystal drive means has first to fourth voltage terminals as said plurality of voltage terminals, said power supply circuit has a series circuit of first to third resistors as said resistor means, said series circuit being connected at one end to said first voltage terminal, having said nodes respectively connected to said second to fourth voltage terminals, and being connected at the other end to said fourth voltage terminal, and said power supply circuit also has first to third capacitors as said capacitor means which are respectively connected between said first power source terminal on one hand and the nodes and the other end of said series circuit on the other hand.

5. A liquid crystal display apparatus according to claim 4, wherein each of said first to third resistors has a resistance value of 100 kΩ and each of said first to third capacitors has a capacitance of $10^4$ pF.

6. A liquid crystal display apparatus according to claim 5, which further comprises a battery connected between said first and second power source terminals.

7. A liquid crystal display apparatus according to claim 1, wherein said power supply circuit further has a plurality of capacitor means connected between said first power source terminal and the nodes of said resistor means, respectively.

8. A liquid crystal display apparatus according to claim 7, wherein said liquid crystal drive means has first to fourth voltage terminals as said plurality of voltage terminals, said power supply circuit has a series circuit of first to third resistors as said resistor means, said series circuit being connected at one end to said first voltage terminal, having said nodes respectively connected to said second to fourth voltage terminals, and being connected at the other end to said fourth voltage terminal, and said power supply circuit also has first to third capacitors as said capacitor means which are respectively connected between said first power source terminal on one hand and the nodes and the other end of said series circuit on the other hand.

9. A liquid crystal display apparatus according to claim 8, wherein each of said first to third resistors has a resistance value of 100 kΩ, and each of said first to third capacitors has a capacitance of $10^4$ pF.

10. A liquid crystal display apparatus according to claim 9, which further comprises a battery connected between said first and second power source terminals.

11. A liquid crystal display apparatus according to claim 1, wherein said liquid crystal drive means has first to fourth voltage terminals as said plurality of voltage terminals, said power supply circuit has a series circuit of first to third resistors, as said resistor means, said series circuit being connected at end to said first voltage terminal, having said nodes respectively connected to said second to fourth voltage terminals, and being connected at the other end to said fourth voltage terminal, and said power supply circuit also has first to third capacitors as said capacitor means which are respectively connected between said first power source terminal on one hand and the nodes and the other end of said series circuit on the other hand.

12. A liquid crystal display apparatus according to claim 1, which further comprises a battery connected between said first and second power source terminals.

* * * * *